US008070103B2

(12) United States Patent
Collette

(10) Patent No.: US 8,070,103 B2

(45) Date of Patent: Dec. 6, 2011

(54) FUEL LINE AIR TRAP FOR AN UNMANNED AERIAL VEHICLE

(75) Inventor: Daniel Ross Collette, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 651 days.

(21) Appl. No.: 12/183,277

(22) Filed: Jul. 31, 2008

(65) Prior Publication Data

US 2010/0024897 A1 Feb. 4, 2010

(51) Int. Cl.
*B64D 33/00* (2006.01)

(52) U.S. Cl. .................. 244/135 R; 244/53 R; 137/177; 137/592; 123/516

(58) Field of Classification Search .............. 244/135 R, 244/135 A, 53 R; 137/177, 179, 197, 590, 137/592; 138/30, 39, 44; 123/516, 198 E; 220/601
See application file for complete search history.

(56) References Cited

U.S. PATENT DOCUMENTS

| | | | | |
|---|---|---|---|---|
| 2,326,175 | A | | 8/1943 | Samiran |
| 2,383,369 | A | | 8/1945 | Curtis |
| 2,952,214 | A | | 9/1960 | Adams |
| 3,212,521 | A | * | 10/1965 | Jean .............................. 137/494 |
| 4,212,600 | A | | 7/1980 | Otto et al. |
| 4,231,719 | A | | 11/1980 | Ringwald et al. |
| 4,309,155 | A | | 1/1982 | Heinz et al. |
| 5,146,901 | A | | 9/1992 | Jones |
| 5,150,857 | A | | 9/1992 | Moffitt et al. |
| 5,152,478 | A | | 10/1992 | Cycon et al. |
| 5,295,643 | A | | 3/1994 | Ebbert et al. |
| 5,355,860 | A | | 10/1994 | Ekstam |
| 5,372,116 | A | * | 12/1994 | Davis ............................ 123/516 |
| 5,575,438 | A | | 11/1996 | McGonigle et al. |
| 5,695,153 | A | | 12/1997 | Britton et al. |
| 5,746,184 | A | | 5/1998 | Ekstam |
| 6,450,445 | B1 | | 9/2002 | Moller |
| 6,604,706 | B1 | | 8/2003 | Bostan |
| 6,691,949 | B2 | | 2/2004 | Plump et al. |
| 6,721,646 | B2 | | 4/2004 | Carroll |
| 7,032,861 | B2 | | 4/2006 | Sanders, Jr. et al. |
| 7,044,422 | B2 | | 5/2006 | Bostan |
| 7,249,732 | B2 | | 7/2007 | Sanders, Jr. et al. |
| 2003/0234002 | A1 | | 12/2003 | Rivera |

(Continued)

FOREIGN PATENT DOCUMENTS

EP 1767453 A1 3/2007

(Continued)

*Primary Examiner* — Craig Schneider
(74) *Attorney, Agent, or Firm* — Shumaker & Sieffert, P.A.

(57) ABSTRACT

A fuel line air trap for an unmanned aerial vehicle has a vessel in-line with a fuel line, fuel line connectors, and fuel inlet and outlet stems. The vessel contains an inlet at a distal end and an outlet at a proximal end. The fuel line connectors are attached to the vessel at the inlet and at the outlet to connect the fuel line to the vessel. The fuel inlet stem attaches to the vessel at the inlet and a fuel outlet stem attaches to the vessel at the outlet. Both the fuel inlet stem and fuel outlet stem protrude into the vessel a predetermined distance such that a gap exists between them. As air bubbles enter the gap in the fuel line air trap, they separate from the flow of fuel and migrate to the exterior walls of the vessel. The air bubbles are purged during remain trapped refueling.

20 Claims, 4 Drawing Sheets

U.S. PATENT DOCUMENTS

2004/0094662 A1 5/2004 Sanders, Jr. et al.
2004/0129828 A1 7/2004 Bostan
2005/0082421 A1 4/2005 Perlo et al.
2006/0049304 A1 3/2006 Sanders, Jr. et al.
2006/0192047 A1 8/2006 Goossen
2006/0231675 A1 10/2006 Bostan
2007/0034738 A1 2/2007 Sanders, Jr. et al.
2007/0051848 A1 3/2007 Mantych et al.
2007/0193650 A1 8/2007 Annati
2007/0221790 A1 9/2007 Goossen et al.
2007/0228214 A1 10/2007 Horak
2007/0244608 A1 10/2007 Rath et al.
2007/0262195 A1 11/2007 Bulaga et al.
2007/0295298 A1 12/2007 Mark

FOREIGN PATENT DOCUMENTS

EP 1767453 B1 6/2008
WO 0015497 3/2000
WO 2004002821 1/2004

* cited by examiner

FUEL LINE AIR TRAP FOR AN UNMANNED AERIAL VEHICLE

GOVERNMENT RIGHTS

The United States Government may have acquired certain rights in this invention pursuant to Government Contract No. W56HZV-05-C-0724 with the U.S. Army (TACOM).

BACKGROUND OF THE INVENTION

Unmanned aerial vehicle (UAV) or micro-air vehicle (MAV) applications that rely on a vacuum from the engine to draw the fuel, as opposed to having a pump in the gas reservoir, may generate air bubbles in the fuel line. In addition, UAVs often encounter turbulence and adverse flying conditions that may introduce air into the fuel line such as when the vehicle pitches or engages in forward flight on a low fuel reserve. Similarly, fuel drawn by a vacuum in an operating environment like the desert where there are elevated temperatures is particularly susceptible to vapor lock caused by air in the fuel line. As such, any of these situations may result in the loss of an air vehicle by starving the engine of fuel.

One apparatus employed to regulate the proper amount of fuel fed to the engine is the carburetor. Carburetors typically contain a float chamber that holds a quantity of fuel for immediate use. This reservoir is constantly replenished with fuel supplied by a fuel pump. The correct fuel level in the chamber is maintained by a float that cooperates with the opening of an inlet valve. As the fuel level is depleted by the engine, the float drops accordingly, opening the inlet valve and admitting fuel. As the fuel level rises, the float rises and seals the inlet valve. Usually, ventilation tubes allow air to escape from the chamber as it fills with fuel or air to enter as the chamber empties, maintaining atmospheric pressure within the float chamber.

However, where the engine may be operated in various orientations relative to the ground, such as in a UAV, the float chamber of a carburetor is rendered useless due to its dependence on gravity. In addition, there is a significant weight associated with the fuel pump and float chamber, which is a key reason for not utilizing them in UAVs. To solve this problem, a flexible diaphragm may be utilized to form a wall of the fuel chamber so that as fuel is drawn into the engine the diaphragm is forced inward by ambient air pressure. The diaphragm is connected to a needle valve and as the diaphragm moves into the chamber the needle valve is forced open to admit more fuel. As fuel enters the chamber, the diaphragm expands outward, closing the needle valve. A balanced state is reached which creates a steady fuel level that remains constant in any orientation. This modified carburetor lacks an air venting mechanism and thus does not resolve the vapor lock issue presented by UAVs.

SUMMARY OF THE INVENTION

The discovery presented herein outlines an apparatus for trapping and removing air bubbles from a fuel line undergoing vacuum pressure generated by an engine, where the apparatus functions in any orientation.

Thus, in a first aspect, the present invention provides a fuel line air trap for an unmanned aerial vehicle comprising: (a) a vessel in-line with a fuel line, wherein the vessel contains an inlet at a distal end and an outlet at a proximal end, (b) a distal fuel line connector and a proximal fuel line connector attached to the vessel at the inlet and at the outlet, respectively, for attaching the fuel line to the vessel, and (c) a fuel inlet stem attached to the vessel at the inlet and a fuel outlet stem attached to the vessel at the outlet, wherein both the fuel inlet stem and fuel outlet stem protrude into the vessel a predetermined distance such that a gap exists between the fuel inlet stem and fuel outlet stem.

The present invention also provides a fuel line air trap for an unmanned aerial vehicle comprising: (a) a vessel in-line with a fuel line, wherein the vessel is positioned sufficiently close to an engine such that any vaporization that occurs in the fuel line between the air trap and the engine will not generate a vapor lock in the engine, wherein the vessel contains an inlet at a distal end and an outlet at a proximal end, wherein the inlet and the outlet are concentric to each other, (b) a distal fuel line connector and a proximal fuel line connector attached to the vessel at the inlet and at the outlet, respectively, for attaching the fuel line to the vessel, and (c) a fuel inlet stem connected to the vessel at the inlet and a fuel outlet stem connected to the vessel at the outlet such that the fuel inlet stem and fuel outlet stem both protrude into the vessel a predetermined distance such that a gap exists between the fuel inlet stem and fuel outlet stem, wherein the volume contained by the vessel between the vessel's distal end and a cross-section of the vessel in a plane substantially perpendicular to the fuel line taken where the fuel inlet stem terminates in the gap and the volume contained by the vessel between the vessel's proximal end and a cross-section of the vessel in a plane substantially perpendicular to the fuel line taken where the fuel outlet stem terminates in the gap are each at least substantially equal to the total volume of air that will be generated before refueling is necessary.

The present invention further provides a fuel line air trap for an unmanned aerial vehicle comprising: (a) a vessel in-line with a fuel line, wherein the vessel is in the form of a cylinder, wherein the vessel is positioned 12 cm or less from an engine to minimize fuel vaporization in the fuel line between the vessel and the engine, wherein the vessel contains an inlet at a distal end and an outlet at a proximal end, wherein the inlet and the outlet are concentric to each other, (b) a distal fuel line connector and a proximal fuel line connector attached to the vessel at the inlet and at the outlet, respectively, for attaching the fuel line to the vessel, and (c) a fuel inlet stem attached to the vessel at the inlet and a fuel outlet stem attached to the vessel at the outlet, wherein both the fuel inlet stem and fuel outlet stem protrude into the vessel a predetermined distance such that a gap exists between the fuel inlet stem and fuel outlet stem.

DETAILED DESCRIPTION OF THE PREFERRED EMBODIMENT

Figure 1:
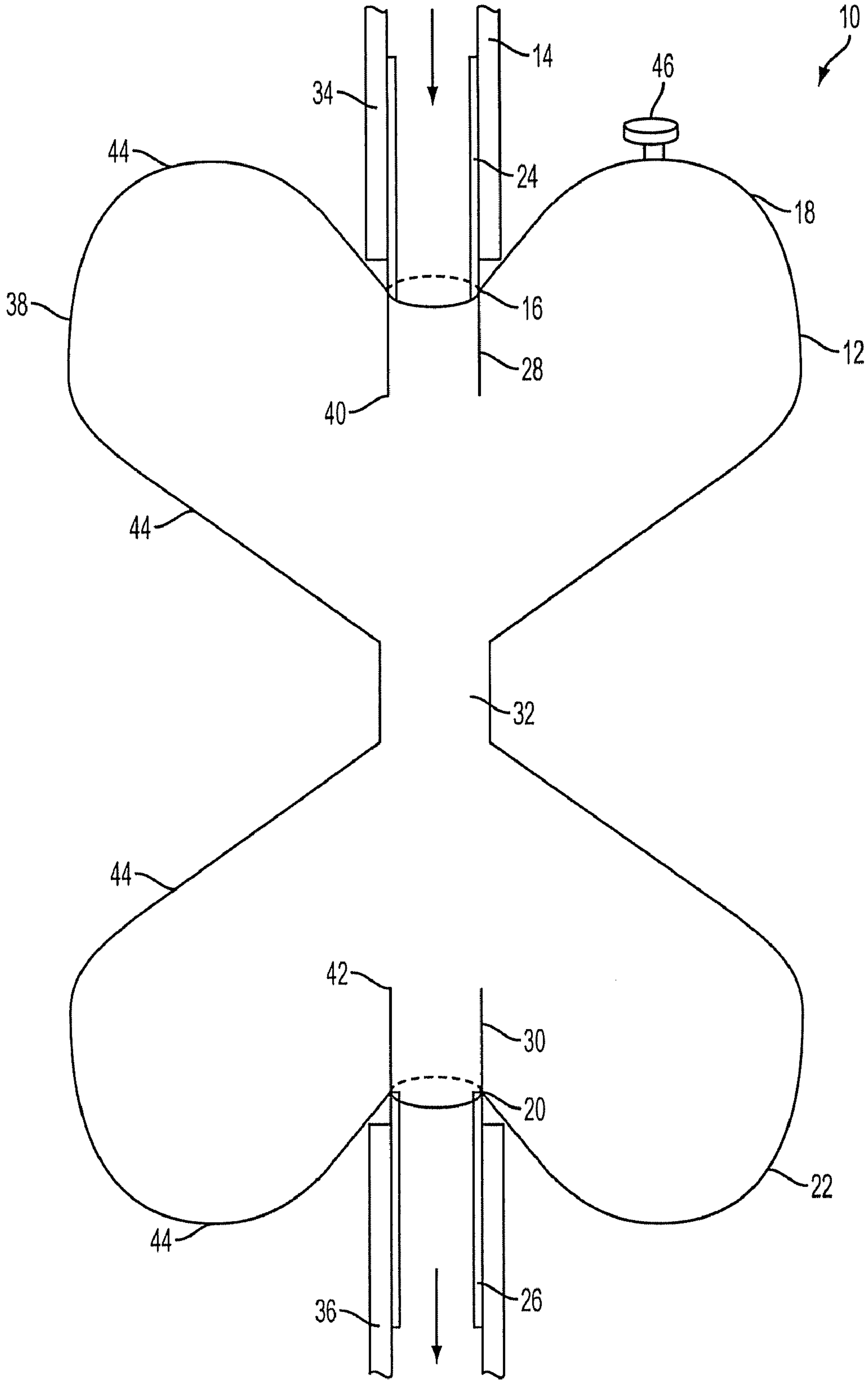
FIG. 1 is a cross-sectional view of one embodiment of the air trap.

In a first aspect, the present invention provides a fuel line air trap 10 for an unmanned aerial vehicle comprising: (a) a vessel 12 in-line with a fuel line 14, wherein the vessel 12 contains an inlet 16 at a distal end 18 and an outlet 20 at a proximal end 22, (b) a distal fuel line connector 24 and a proximal fuel line connector 26 attached to the vessel 12 at the inlet 16 and at the outlet 20, respectively, for attaching the fuel line 14 to the vessel 12, and (c) a fuel inlet stem 28 attached to the vessel 12 at the inlet 16 and a fuel outlet stem 30 attached to the vessel 12 at the outlet 20, wherein both the fuel inlet stem 28 and fuel outlet stem 30 protrude into the vessel 12 a predetermined distance such that a gap 32 exists between the fuel inlet stem 28 and fuel outlet stem 30.

Figure 3:
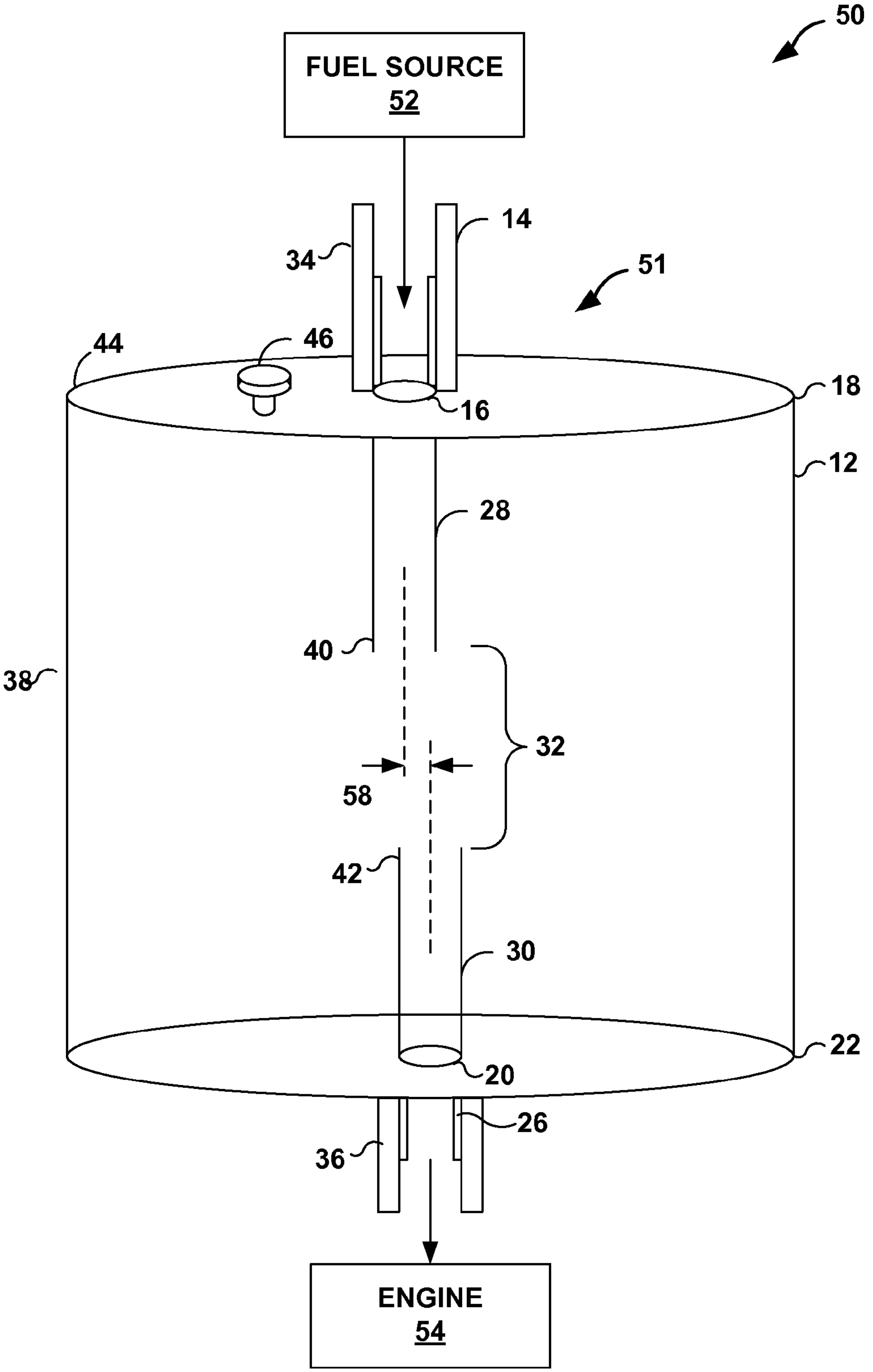
FIG. 3 is a cross-sectional view of one embodiment of a system including an air trap comprising an inlet and an outlet eccentric to one another.

As used herein, the fuel line 14 is divided into two sections 34, 36 such that the first section 34 is connected between a fuel source (shown in FIG. 3) and the vessel 12 and the second section 36 is connected between the vessel 12 and the engine (shown in FIG. 3). The centerlines of the two sections 34, 36 of the fuel line 14 may either lie on substantially the same axis or substantially parallel axes.

As used herein, the vessel 12 consists of a body 38, an inlet 16, an outlet 20, a fuel inlet stem 28, a fuel outlet stem 30, a distal fuel line connector 24, and a proximal fuel line connector 26. The vessel body 38 is in-line with the fuel line 14 such that the end of the vessel 12 closest to the fuel source is the distal end 18, whereas the end closest to the engine is the proximal end 22. The vessel body 38 may take many forms, including for example an hourglass (see FIG. 1), cylinder (see FIG. 2), box, sphere, etc. The vessel 12 is preferably made of any material not affected by gas or diesel fuels, for example polypropylene plastic. The vessel 12 is also preferably transparent or translucent to assist in determining whether air has been purged from the fuel system during refueling.

The distal end 18 of the vessel 12 contains an inlet 16 and the proximal end 22 contains an outlet 20. The distal and proximal fuel line connectors 24, 26 are located at the vessel inlet 16 and vessel outlet 20, respectively. These connectors 24, 26 may be molded as part of the vessel body such that they protrude from the exterior of the vessel 12 in the form of stems. In this stem configuration, the fuel line connectors 24, 26 have an outer diameter that allows each connector to fit snugly within the fuel line 14 and be secured with any type of clamp (not shown) generally known in the art. Alternatively, the external surface of the stem fuel line connectors 24, 26 may be threaded to connect to a fuel line 14 with corresponding threads. The fuel line connectors 24, 26 may similarly be recessed in the vessel body and threaded to receive a fuel line 14 with corresponding threads.

The fuel inlet stem 28 and fuel outlet stem 30 are also located at the vessel's inlet 16 and outlet 20. These fuel inlet and outlet stems 28, 30 may be molded as part of the vessel body such that they protrude into the vessel 12 and are located between the fuel line connectors 24, 26. The fuel stems 28, 30 extend a predetermined distance such that a gap 32 exists between the fuel inlet and outlet stems 28, 30. The gap 32 is small enough for the fuel outlet stem 30 to draw from the fuel in the gap 32, rather than from adjacent accumulated air, and wide enough that the velocity of the fuel entering the vessel 12 will not carry an air bubble across the gap 32 into the fuel outlet stem 30. This gap distance is preferably 12 cm. The predetermined distance each stem 28, 30 extends is preferably of a length such that the fuel inlet and outlet stems 28, 30 do not overlap, for example, in the case where the stems 28, 30 are not concentrically aligned.

In operation, the UAV or MAV is purged of air and fully fueled. In this state the fuel source, fuel line 14, and air trap 10 are completely filled with fuel. As the UAV or MAV consumes fuel during the course of a flight, air bubbles are generated in the system due to operating conditions, such as high temperatures, turbulence, a low fuel reserve, etc. These air bubbles are carried through the fuel line 14 to the air trap 10. The fuel enters the vessel 12 through the fuel inlet stem 28. When the air bubbles reach the gap 32, the velocity of the fuel slows to a degree that allows the air bubbles to separate from the fuel flow and float to the exterior wall 44, 18, 22 of the air trap's vessel 12, as opposed to being pulled into the fuel outlet stem 30. If the UAV is in a standard forward flight orientation, the air bubbles will float to the top, which in this aspect is the distal end 18. If the UAV is maneuvering in various orientations, the accumulated air pocket in the air trap 10 will travel along the walls 44 of the vessel 12 to the highest point relative to the ground, and any entering air bubbles will travel through the fuel to this air pocket. Since the accumulated air travels along the perimeter of the vessel 12, the fuel outlet stem 30 continues to draw only fuel from the gap 32.

In one embodiment, the vessel 12 is positioned sufficiently close to an engine such that any vaporization that occurs in the fuel line 14 between the air trap 10 and the engine will not generate a vapor lock in the engine. The required distance from the air trap 10 to the engine is primarily a function of the vacuum generated by the engine and the environmental operating temperature. Air bubbles are generated faster in the presence of a stronger vacuum and higher temperature. For instance, in a desert environment where temperatures reach upwards of 100 degrees, the air trap is preferably 5 to 12 cm from the engine. Likewise, when the vacuum generated is lower and/or the environmental temperature is lower, the air trap can be greater than 12 cm away from the engine. Another factor to consider is that as the vacuum in the fuel line 14 increases due to the amount of unconsumed fuel decreasing, the fuel tends to vaporize more easily as it is drawn through the fuel line 14. So an air trap 10 at a distance greater than 12 cm may be functional during the initial portion of the flight but could fail under an increasing vacuum in later flight. This makes clear that the closeness of the air trap 10 to the engine is dependent on the application and conditions in which the particular UAV or MAV is designed to fly under. Thus, by placing the air trap 10 sufficiently close to the engine any vaporization that occurs in the fuel line 14 between the air trap 10 and the engine will be negligible.

In one embodiment, the volume contained by the vessel 12 between the vessel's distal end 18 and the point 40 at which the fuel inlet stem 28 terminates in the gap 32 and the volume contained by the vessel 12 between the vessel's proximal end 22 and the point 42 at which the fuel outlet stem terminates 30 in the gap 32 are each at least equal to the total volume of air that will be generated before refueling is necessary. By configuring the vessel's volume in this manner, the accumulated air will remain adjacent to the vessel wall and the inlet or outlet fuel stems 28, 30, depending on the orientation of the UAV in flight, and will avoid being drawn into the fuel flow in the gap 32. If the accumulated air were to exceed the volume at the distal end 18 near the fuel inlet stem 28, the air pocket would in effect shorten the gap 32 and the force of the fuel flow from the fuel inlet stem 28 could introduce the air into the fuel outlet stem 30. Similarly, if the accumulated air pocket were to travel along the vessel walls 44 to the proximal end 22 and exceed the volume of the vessel adjacent to the fuel outlet stem 30, the air would be drawn directly into the fuel outlet stem 30.

FIG. 3 is a cross-sectional view of one embodiment of a system 50 including an air trap 51 comprising an inlet 16 and an outlet 20 eccentric to one another. The system 50 includes a fuel source 52 coupled to the air trap 51 at a distal end and an engine 54 coupled to the air trap 51 at a proximal end. In one embodiment, the inlet 16 is offset from the center of the vessel's distal end 18 and the outlet 20 is located at the center of the vessel's proximal end 22 such that the inlet 16 and outlet 20 are eccentric. The inlet 16 and the outlet 20 are offset by a distance 58 in the example shown in FIG. 3. By offsetting the inlet 16 and outlet 20, the fuel inlet and outlet stems 28, 30 are likewise offset. This eccentric configuration reduces the velocity of the fuel across the gap 32, which allows air bubbles to separate more easily from the flow of the fuel and travel to the accumulated air pocket. Though both the fuel inlet and outlet stem 28, 30 could be offset from the center of each respective end 18, 22 of the vessel 12, offsetting the fuel inlet stem 28 is preferred. By retaining the fuel outlet stem 30 in the center, the vacuum draw is kept away from the sidewalls 44 of the vessel 12 and therefore away from the accumulated air pocket.

In one embodiment, the inlet 16 and the outlet 20 are substantially concentric to each other. This configuration is preferred over the eccentric alignment of the inlet 16 and outlet 20. In the eccentric alignment there is a possibility that as an air bubble enters the vessel 12 the UAV may alter its orientation such that the fuel outlet stem is directly in the air bubble's path to the air pocket. Though this situation would be unlikely, aligning the fuel inlet and outlet stems 28, 30 concentrically avoids this situation altogether. As an air bubble enters the vessel 12 in a concentric configuration, the fuel outlet stem 30 would only reside in the path of an air bubble if the UAV were completely upside down and flying straight towards the ground. However, this upside down flight orientation is the least likely maneuver to occur during a UAV flight.

Figure 4:
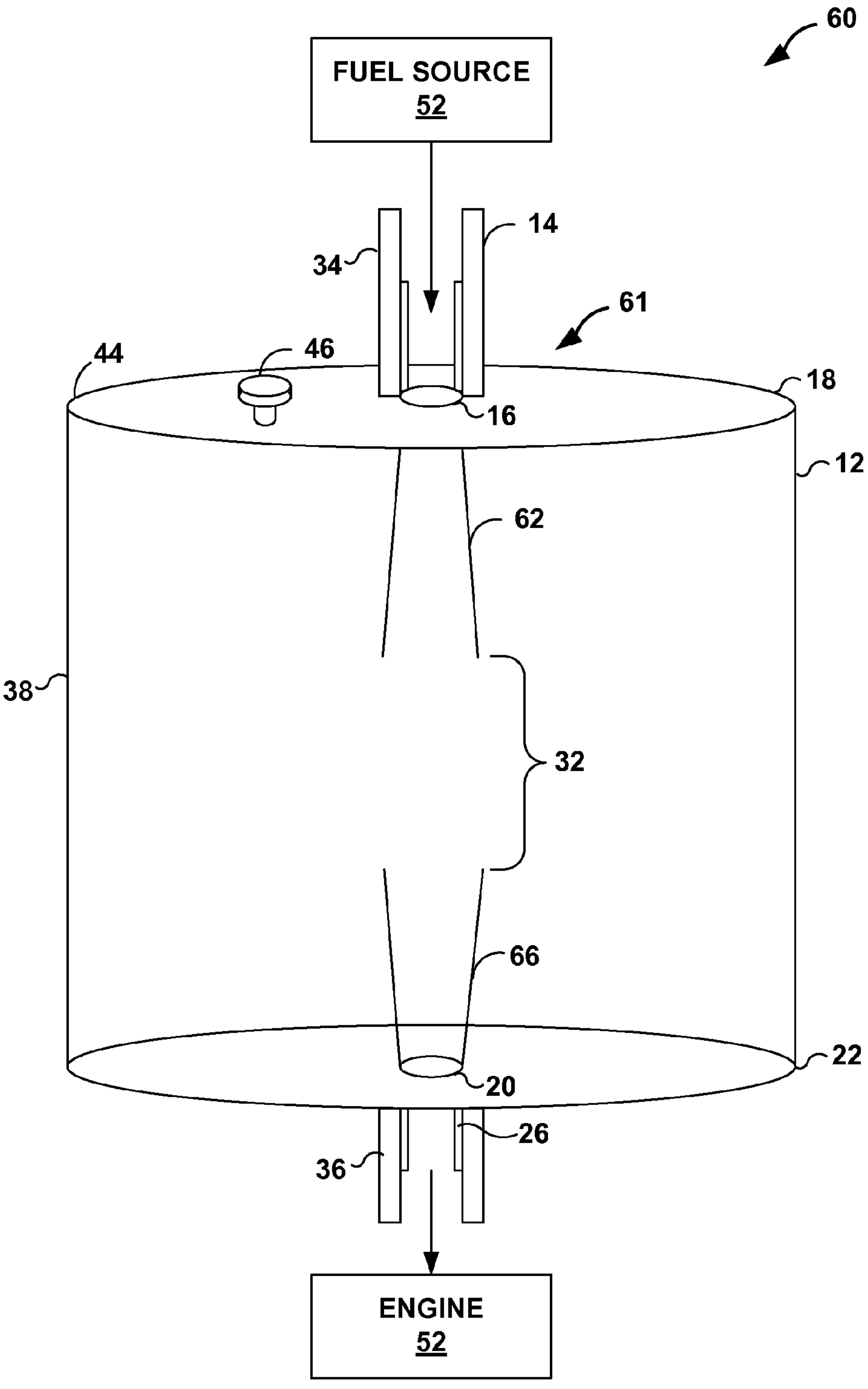
FIG. 4 is a cross-sectional view of one embodiment of a system including an air trap comprising a tapered fuel inlet stem and a tapered fuel outlet stem.

FIG. 4 is a cross-sectional view of one embodiment of a system 60 including an air trap 61 having a tapered fuel inlet stem 62 and a tapered fuel outlet stem 66. In one embodiment, the diameters of the fuel inlet stem and fuel outlet stem 62, 66 are tapered to be larger near the gap than the diameters at the inlet 16 and outlet 20, respectively. By tapering the diameter of the fuel inlet and outlet stems 62, 66 in this manner, the velocity of the fuel is slowed. A slower velocity across the gap 32 is advantageous because it allows the air more time to separate from the fuel flow and accumulate in the air trap 10.

In one embodiment, the diameter of the vessel 12 at the midpoint of the gap 32 between the fuel inlet stem 62 and the fuel outlet stem 66 is larger than the diameter of the fuel inlet stem 62 at the inlet 16 and the diameter of the fuel outlet stem at the outlet 20. This configuration again slows the velocity of the fuel through the air trap 10 and allows the air more time to separate from the fuel flow.

In one embodiment, the fuel line air trap 10 further comprises one or more release valves 46 connected to the vessel 12 to purge trapped air. These one or more release valves 46 are manually opened during refuel to allow air to be purged from the system.

In one embodiment, the one or more release valves 46 are located at the highest point of the vessel 12 relative to the ground when the UAV is at rest. In this aspect of the invention, the distal end 18 of the vessel 12 represents the highest point of the air trap 10 when the UAV is at rest. Thus, as fuel enters the air trap 10 during refuel, air will be purged from the release valves 46. If it were otherwise, fuel would spill from the valves 46 before all the air in the trap 10 was purged.

In one embodiment, the center of the gap 32 is located substantially midway between the distal and proximal ends 18, 22.

In one embodiment, the vessel 12 is substantially symmetrical on either side of the gap 32.

Figure 2:
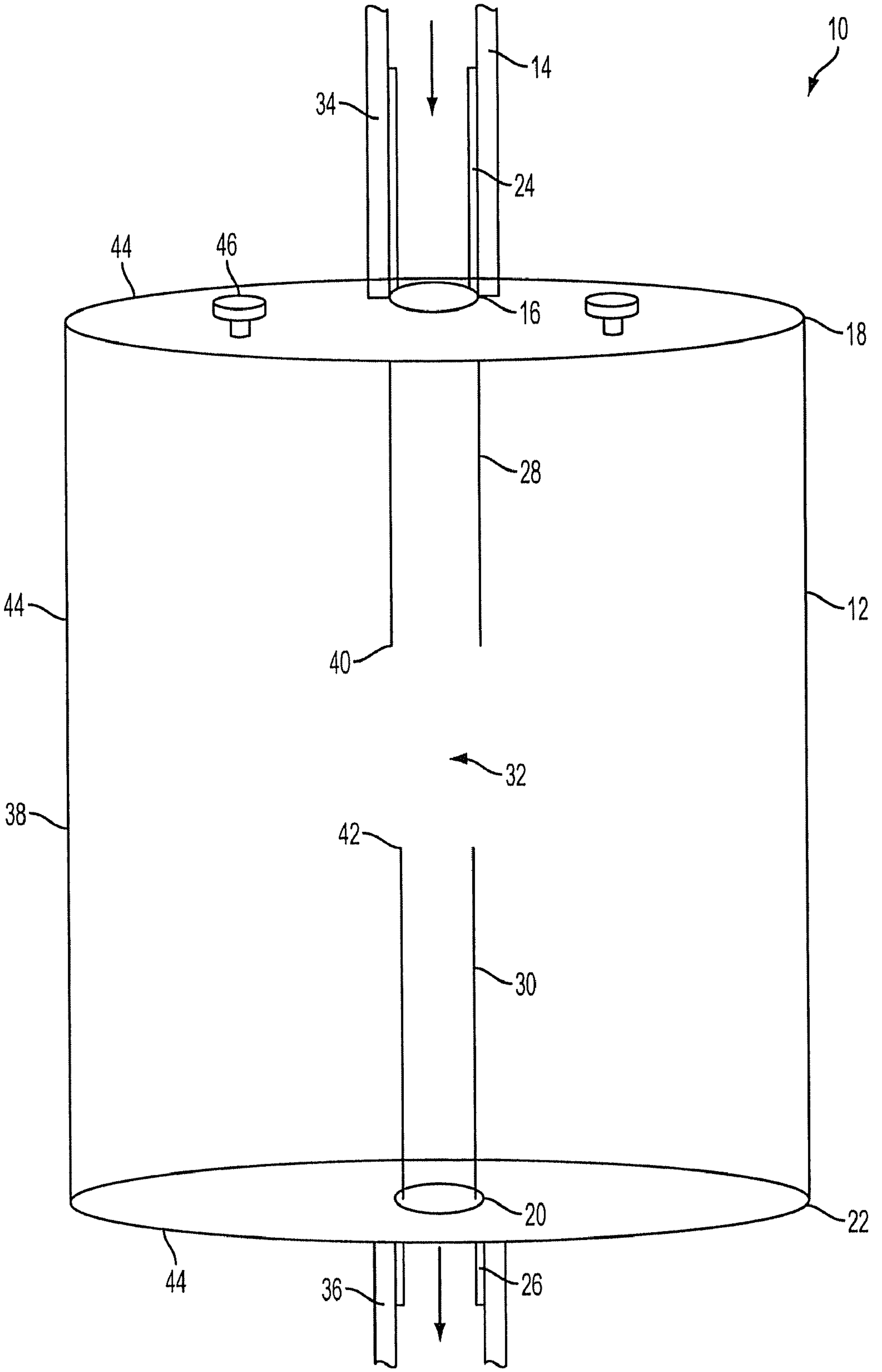
FIG. 2 is cross-sectional view of another embodiment of the air trap.

In one embodiment, the vessel 12 is in the form of a cylinder (see FIG. 2).

In one embodiment, the vessel 12 is in the form of an hourglass (see FIG. 1).

In a second aspect, the present invention may take the form of a fuel line air trap 10 for an unmanned aerial vehicle comprising: (a) a vessel 12 in-line with a fuel line 14, wherein the vessel 12 is positioned sufficiently close to an engine such that any vaporization that occurs in the fuel line 14 between the air trap 10 and the engine will not generate a vapor lock in the engine, wherein the vessel 12 contains an inlet 16 at a distal end 18 and an outlet 20 at a proximal end 22, wherein the inlet 16 and the outlet 20 are concentric to each other, (b) a distal fuel line connector 24 and a proximal fuel line connector 26 attached to the vessel 12 at the inlet 16 and at the outlet 20, respectively, for attaching the fuel line 14 to the vessel 12, and (c) a fuel inlet stem 28 is connected to the vessel 12 at the inlet 16 and a fuel outlet stem 30 is connected to the vessel 12 at the outlet 20 such that the fuel inlet stem 28 and fuel outlet stem 30 both protrude into the vessel 12 a predetermined distance such that a gap 32 exists between the fuel inlet stem 28 and fuel outlet stem 30, wherein the volume contained by the vessel 12 between the vessel's distal end 18 and the point 40 at which the fuel inlet stem terminates in the gap 32 and the volume contained by the vessel 12 between the vessel's proximal end 22 and the point 42 at which the fuel outlet stem terminates in the gap 32 are each at least substantially equal to the total volume of air that will be generated before refueling is necessary.

In one embodiment, the center of the gap 32 is located substantially midway between the distal and proximal ends 18, 22.

In another embodiment, the fuel line air trap 10 further comprises one or more release valves 46 connected to the vessel 12 to purge trapped air.

In a further embodiment, the one or more release valves 46 are located at the highest point of the vessel relative to the ground when the UAV is at rest.

In a third aspect, the present invention may take the form of a fuel line air trap for an unmanned aerial vehicle comprising: (a) a vessel 12 in-line with a fuel line 14, wherein the vessel 12 is in the form of a cylinder (see FIG. 2), wherein the vessel 12 is positioned 12 cm or less from an engine to minimize fuel vaporization in the fuel line 14 between the vessel 12 and the engine, wherein the vessel 12 contains an inlet 16 at a distal end 18 and an outlet 20 at a proximal end 22, wherein the inlet 16 and the outlet 20 are concentric to each other, (b) a distal fuel line connector 24 and a proximal fuel line connector 26 attached to the vessel 12 at the inlet 16 and at the outlet 20, respectively, for attaching the fuel line 14 to the vessel 12, and (c) a fuel inlet stem 28 attached to the vessel 12 at the inlet 16 and a fuel outlet stem 30 attached to the vessel 12 at the outlet 20, wherein both the fuel inlet stem 28 and fuel outlet stem 30 protrude into the vessel 12 a predetermined distance such that a gap 32 exists between the fuel inlet stem 28 and fuel outlet stem 30.

In one embodiment, the diameters of the fuel inlet stem 28 and fuel outlet stem 30 are tapered to be larger near the gap than the diameters at the inlet 16 and outlet 20, respectively.

In another embodiment, the fuel line air trap 10 further comprises one or more release valves 46 connected to the vessel 12 to purge trapped air.

The invention claimed is:

1. A system for an unmanned aerial vehicle, the system comprising:

a fuel line air trap, comprising:

a vessel in-line with a fuel line, wherein the vessel comprises an inlet at a distal end and an outlet at a proximal end;

a distal fuel line connector and a proximal fuel line connector attached to the vessel at the inlet and at the outlet, respectively, and configured to attach the fuel line to the vessel; and a fuel inlet stem attached to the vessel at the inlet and a fuel outlet stem attached to the vessel at the outlet, wherein both the fuel inlet stem and fuel outlet stem protrude into the vessel a predetermined distance such that a gap exists between the fuel inlet stem and fuel outlet stem, wherein at least a portion of the gap is in-line with the fuel line.

2. The system of claim 1, further comprising:

an engine, wherein the vessel is positioned sufficiently close to the engine such that any vaporization that occurs in the fuel line between the air trap and the engine will not generate a vapor lock in the engine.

3. The system of claim 1, wherein a volume contained by the vessel between the vessel's distal end and a point at which the fuel inlet stem terminates in the gap and a volume contained by the vessel between the vessel's proximal end and a point at which the fuel outlet stem terminates in the gap are each at least substantially equal to a total volume of air that will be generated before refueling is necessary.

4. The system of claim 1, wherein the inlet is offset from a center of the vessel's distal end and the outlet is located at a center of the vessel's proximal end such that the inlet and outlet are eccentric.

5. The system of claim 1, wherein the inlet and the outlet are substantially concentric to each other.

6. The system of claim 1, wherein the fuel inlet stem is tapered such that a diameter of the fuel inlet stem near the gap is larger than a diameter of the fuel inlet stem near the inlet, and the fuel outlet stem is tapered such that a diameter of the fuel outlet stem near the gap is larger than a diameter of the fuel outlet stem near the outlet.

7. The system of claim 1, wherein a diameter of the vessel at a midpoint of the gap between the fuel inlet stem and the fuel outlet stem is larger than a diameter of the fuel inlet stem at the inlet and a diameter of the fuel outlet stem at the outlet.

8. The system of claim 1, further comprising one or more release valves connected to the vessel to purge trapped air.

9. The system of claim 8, wherein the one or more release valves are located at a highest point of the vessel relative to a ground level when the unmanned aerial vehicle (UAV) is at rest.

10. The system of claim 1, wherein a center of the gap is located substantially midway between the distal and proximal ends.

11. The system of claim 1, wherein the vessel is substantially symmetrical on either side of the gap.

12. The system of claim 11, wherein the vessel is in the form of a cylinder.

13. The system of claim 11, wherein the vessel is in the form of an hourglass.

14. A fuel line air trap for an unmanned aerial vehicle comprising:

a vessel in-line with a fuel line, wherein the vessel comprises an inlet at a distal end and an outlet at a proximal end, wherein the inlet and the outlet are concentric to each other;

a distal fuel line connector and a proximal fuel line connector attached to the vessel at the inlet and at the outlet, respectively, and configured to attach the fuel line to the vessel; and a fuel inlet stem connected to the vessel at the inlet and a fuel outlet stem connected to the vessel at the outlet such that the fuel inlet stem and fuel outlet stem both protrude into the vessel a predetermined distance such that a gap exists between the fuel inlet stem and fuel outlet stem at least partially in-line with the fuel line, wherein a volume contained by the vessel between the vessel's distal end and a point at which the fuel inlet stem terminates in the gap and a volume contained by the vessel between the vessel's proximal end and a point at which the fuel outlet stem terminates in the gap are each at least substantially equal to a total volume of air that will be generated before refueling is necessary.

15. The fuel line air trap of claim 14, wherein the center of the gap is located substantially midway between the distal and proximal ends.

16. The fuel line air trap of claim 14, further comprising one or more release valves connected to the vessel to purge trapped air.

17. The fuel line air trap of claim 16, wherein the one or more release valves are located at a highest point of the vessel relative to a ground level when the unmanned aerial vehicle (UAV) is at rest.

18. A system for an unmanned aerial vehicle comprising:

an engine; and a fuel line air trap, comprising:

a vessel in-line with a fuel line, wherein the vessel is in the form of a cylinder, wherein the vessel is positioned approximately 12 centimeters (cm) or less from the engine to minimize fuel vaporization in the fuel line between the vessel and the engine, wherein the vessel comprises an inlet at a distal end and an outlet at a proximal end, wherein the inlet and the outlet are concentric to each other;

a distal fuel line connector and a proximal fuel line connector attached to the vessel at the inlet and at the outlet, respectively, for attaching the fuel line to the vessel; and a fuel inlet stem attached to the vessel at the inlet and a fuel outlet stem attached to the vessel at the outlet, wherein both the fuel inlet stem and fuel outlet stem protrude into the vessel a predetermined distance such that a gap exists in-line with the fuel line between the fuel inlet stem and fuel outlet stem.

19. The system of claim 18, wherein the fuel inlet stem is tapered such that a diameter of the fuel inlet stem near the gap is larger than a diameter of the fuel inlet stem near the inlet, and the fuel outlet stem is tapered such that a diameter of the fuel outlet stem near the gap is larger than a diameter of the fuel outlet stem near the outlet.

20. The system of claim 18, further comprising one or more release valves connected to the vessel to purge trapped air.

* * * * *